Feb. 5, 1957 E. J. GOEPPINGER ET AL 2,780,776

LINEARITY TESTER

Filed March 6, 1953

INVENTORS
EDWARD J. GOEPPINGER
ROBERT M. WHITEHORN
MARLAN E. BOURNS
MARVIN E. HARRISON

BY Herbert E. Fidder AGENT

United States Patent Office 2,780,776
Patented Feb. 5, 1957

2,780,776
LINEARITY TESTER

Edward J. Goeppinger, Robert M. Whitehorn, Marlan E. Bourns, and Marvin E. Harrison, Riverside, Calif.; said Goeppinger, said Whitehorn, and said Harrison assignors to said Bourns Application March 6, 1953, Serial No. 340,782

11 Claims. (Cl. 324—63)

The present invention relates generally to testing instruments, and more specifically to a device for comparing the output linearity of an electrical resistance element to the known output linearity of a standard resistance element. Hence, the invention is termed a linearity tester.

In the manufacture of precision potentiometers and variable resistors, it is necessary to produce instruments of uniform output linearity. In some instances, the desired output may be a substantially linear curve, whereas in other instances the output may be a functional curve. In either case, it is essential that all instruments of a given specification have substantially identical output curves, and this is achieved by comparing the output of each instrument against the known output of a standard resistor. A true measurement of non-linearities cannot be accomplished by point-to-point calibration, since excessive deviation may occur between the discrete points checked but will not be observed.

A primary object of the present invention is to provide a testing instrument capable of measuring non-linearities continuously over the full length of a resistance element, or a device incorporating such a resistance element.

Another object is to provide a test instrument of the class described, embodying a bridge circuit for comparing the output of a test resistance element against the known output of a standard resistance element. In this same connection, one important object of the invention is to provide a bridge circuit wherein two separate, variable resistance adjustments are provided for adjusting the output of the test resistance element for the two end positions of sliding contact along the element, the said adjustments being substantially independent of one another. Thus, the output of the element for either end position of the contact may be varied without affecting the output for the other end position of the contact.

A further object is to provide an instrument of the class described which is simple and convenient to use, rugged in construction, and relatively inexpensive to manufacture.

Still another object is to provide a new and improved multi-turn rotary variable resistor, wherein the resistance element is wound on a helix, and the contact engaging the element is supported in such a manner as to move axially while it is being rotated, so as to follow the helix of the resistance element.

The foregoing objects are achieved by providing an accurately machined lead screw which supports and actuates a non-rotating slide in such a manner that the linear position of the slide is proportional to the angular position of the lead screw shaft. The shaft is directly coupled to a standard multi-turn potentiometer of known calibration. The slide is directly coupled to an electrical contact which wipes the surface of the test resistance element. A bridge circuit is connected to the ends of the two resistance elements and to the two contacts, whereby the output of the test element can be compared to the output of the standard potentiometer. Any deviation of the output of the test element from that of the standard potentiometer is indicated on a suitable indicator, such as an oscilloscope, recorder, or meter.

Other objects and advantages of the present invention will become apparent to those skilled in the art upon consideration of the following detailed description of certain preferred forms of our invention, reference being had to the accompanying drawings, wherein.

Figure 1:
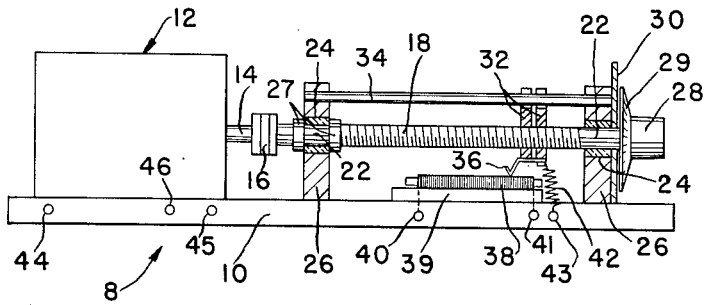
Figure 1 is a partially cut-away illustration of a device embodying the principles of our invention.

In Figure 1 of the drawings, the instrument of our invention is designated in its entirety by the reference numberal 8, and is seen to comprise a base 10, upon which is mounted a standard multi-turn rotary resistor, or potentiometer 12, of known output linearity. The potentiometer 12 has a rotatable operating member 14 in the form of a shaft projecting from one end of the resistor housing. For satisfactory resolution of the instrument, it is desirable that the operating member 14 have a total operational range of about 10 turns, although a greater or lesser number of turns may be used.

Connected to the operating member 14 by a coupling 16 is an accurately machined lead screw 18, having smooth journal portions 22 that are supported in bushings 24. The bushings 24 are mounted in flanges 26 extending upwardly from the base 10; and the lead screw 18 is constrained against endwise movement by two collars 27 fixed to the shaft on opposite sides of one of the flanges 26 and bearing against opposite ends of the bushing 24. Fixed to the outer end of the lead screw 18 is a knob 28, by means of which the lead screw is turned. An indexed dial 29 on the knob registers with a reference point on a panel 30 to indicate the angular position of the lead screw.

Mounted on the lead screw 18 in threaded engagement therewith is a two-piece, spring-loaded nut 32, which is so constructed and arranged as to provide zero back lash with respect to the threads of the lead screw. The nut 32 is slidably engaged by a guide rod 34, which prevents the nut from turning on the lead screw, while at the same time permitting freedom of axial movement. A contact 36 is attached to the underside of the nut 32, and this contact slidably engages a rectilinear resistance element 38 mounted on a supporting holder 39, which is to be checked for output linearity.

The ends of the resistance element 38 are connected to two terminals 40 and 41 on the base 10, while the contact 36 is connected by an extensible, spring-wound conductor 42 to a third terminal 43. The potentiometer 12 also has three terminals 44, 45, and 46; the first two of which are connected to the ends of the resistance element shown at 50 in the schematic diagrams of Figures 3 and 4, and the third terminal 46 being connected to the sliding contact 51 (Figures 3 and 4) engaging the element.

Figure 2:
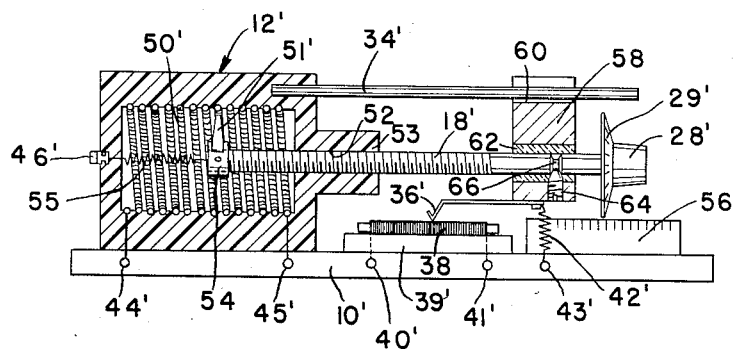
Figure 2 is a sectional view of another embodiment of our invention.

In the embodiment shown in Figure 2, the potentiometer 12' is of a new and unique construction, wherein the resistance element 50' is wound in a helix. The lead screw 18' is engaged by threads at 52, which are tapped into a bore extending through a boss 53 on the end of the potentiometer housing. The threads 52 act to drive the lead screw 18' in the endwise direction when the lead screw is rotated, and the threads of the lead screw have the same lead, or pitch, as the lead of the helix of the resistance element 50'. A part 54 is fixed on the end of the lead screw 18', and mounted on this part is a contact 51', which wipes the resistance element 50'. The contact 51′ is connected to a terminal 46′ on the end of the potentiometer housing by a spring-wound conductor 55, which is extensible and contractible to follow the endwise movement of the contact.

Mounted on the other end of the lead screw 18′ is a knob 28′ and dial 29′, which cooperates with a linear scale 56 on the base, to indicate the number of turns made by the screw.

The contact 36′, which wipes the test resistance element 38, is mounted on a carrier 58 and is connected with terminal 43′ by a spring-wound conductor 42′. The carrier 58 is slidingly engaged by a guide rod 34′, which prevents it from turning with the shaft, said guide rod having one end embedded in the potentiometer housing and projecting therefrom parallel to the lead screw 18′. The carrier 58 is provided with a groove 60 in its top end, through which the guide rod passes.

A bushing 62 in the carrier provides a bearing in which the shaft of the lead screw 18′ turns, and a set screw 64 in the carrier engages a groove 66 in the shaft to prevent relative endwise movement of the carrier with respect to the shaft. Thus, the carrier is caused to move endwise with the shaft, carrying the contact 36′ with it.

Figure 3:
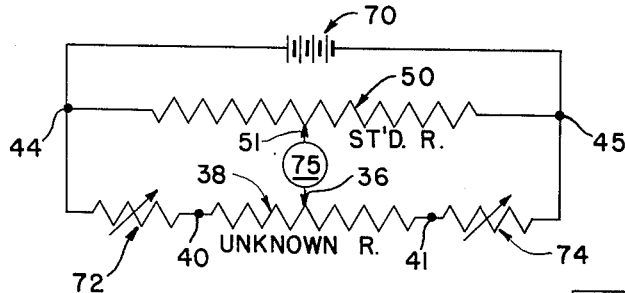
Figure 3 is a circuit diagram for one form of our invention.

In the bridge circuit shown in Figure 3, a source of voltage potential, such as a battery 70, is connected across the terminals 44, 45 of the potentiometer 12. Connected to terminal 44 of the potentiometer 12 and to terminal 40 of the test resistance element 38 is a variable resistor 72. A second variable resistor 74 is connected to terminal 45 of the potentiometer 12 and to terminal 41 of the element 38. An indicator 75, such as an oscilloscope, meter, or recorder, is connected across the terminals 43, 46 of contacts 36 and 51.

Figure 5:
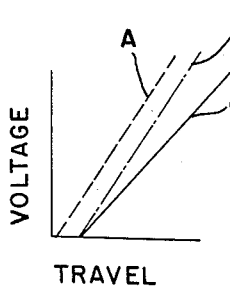
Figure 5 is a graph, showing the voltage/travel curve of a test resistance element for three different adjustments of the instrument.

In testing an element 38, the contact 36 is first moved to one end of the element 38, which carries the contact 51 to the corresponding end of the potentiometer resistance element 50. If the contacts 36, 51 are first moved to the left in Figure 3, the variable resistor 72 would then be adjusted to balance the output of the element 38 against the output of the element 50. The effect of this adjustment would be to shift the output curve of the element 38 from line A of Figure 5 to line B.

The contacts 36, 51 would then be moved to the right hand end of their respective resistance elements, and resistor 74 is then adjusted to balance the output of the element 38 against the output of the element 50. This has the effect of changing the slope of the output curve of element 38 from line B to line C of Figure 5; line C representing the position and slope of the output curve of the standard potentiometer resistance element 50.

With the two end adjustments thus set, the lead screw 18 is slowly turned, advancing the contacts 36, 51 from one end of their respective resistance elements to the other. The indicator 75 indicates or records any deviation of the output of the test element from that of the standard potentiometer, and the amount of non-linearity of the output of element 38 can be accurately determined. It should be pointed out that adjustment of one of the variable resistors 72, 74 affects the setting of the other, and it is necessary to readjust the resistors until a balanced condition is obtained.

Figure 4:
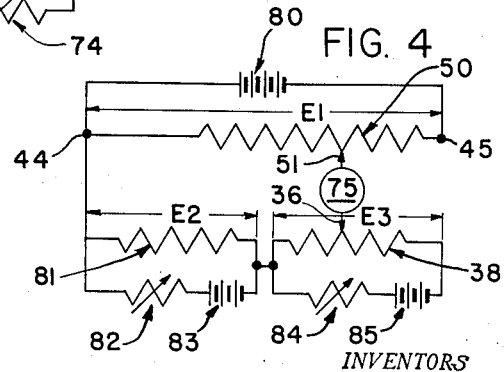
Figure 4 is a circuit diagram for another form of our invention.

The bridge circuit of Figure 4 is essentially similar to that of Figure 3, but differs therefrom in the important respect that the two variable resistors are independent of one another, and do not require readjustment back and forth. In this case, the source of voltage potential is a battery 80, which is connected across the ends of the potentiometer resistance element 50. A fixed resistor 81 is connected between one end of element 38 and the corresponding end of element 50. A variable resistor 82 and a second battery 83 are connected in series across the ends of the resistor 81. Another variable resistor 84 and a third battery 85 are connected in series across the ends of the resistance element 38. An indicator 75 is connected across the terminals 43, 46 of the contacts 36 and 51.

The testing procedure for the circuit of Figure 4 is the same as in the circuit of Figure 3, except that adjustment of either of the variable resistors 82, 84 has an almost negligible effect on the setting of the other; hence, readjustment of the resistors 82, 84 is usually not necessary. This is due to the fact that separate circuits and sources of voltage potential are used to provide the voltages E2 and E3 of Figure 4.

While we have shown and described in some detail what we believe to be the preferred form of our invention, it will be understood that various changes may be made without departing from the broad scope of the appended claims. For example, the lead screw 18 might be motor driven; and servo end balancing devices might be incorporated, instead of the manually operated end balancing resistors. Such servo balancing could consist of two multi-turn rotary potentiometers operated by a servomotor, which is operated in turn, by the amplified voltage between contacts 36 and 51. This arrangement would provide automatic balancing of the circuit at each end of the element or instrument to be tested.

We claim:

1. A device for testing the output linearity of a rectilinear resistance element, said device comprising a multi-turn rotary variable resistor of known output linearity, said rotary resistor having a rotatable operating shaft, a lead screw connected to said shaft, a member having threaded engagement with said lead screw and movable axially thereby when said lead screw is rotated, a contact on said member wiping on said rectilinear resistance element, circuit means connected to said rectilinear resistance element and its contact and to said rotary resistor, and an indicator in said circuit means operative to show any variance between the output of said rectilinear resistance element and the output of said rotary resistor.

2. A device for testing the output linearity of a rectilinear resistance element, said device comprising a multi-turn rotary variable resistor of known output linearity, said rotary resistor having a rotatable contact slidably engaging a helical resistance element, a lead screw connected to said contact, a member having threaded engagement with said lead screw and movable axially thereby when said lead screw is rotated, a contact on said member wiping on said rectilinear resistance element, circuit means connected to said rectilinear resistance element and its contact and to said rotary resistor and its contact, and an indicator in said circuit means operative to show any variance between the output of said rectilinear resistance element and the output of said rotary resistor.

3. A device for testing the output linearity of a rectilinear resistance element, said device comprising a multi-turn rotary variable resistor of known output linearity, said rotary resistor having a rotatable and axially movable contact slidably engaging a helical resistance element, a lead screw connected to said contact, said lead screw having the same lead to its threads as the lead of said helical resistance element, stationary threaded means engaging said lead screw and moving the same axially when the lead screw is rotated, a non-rotatable member engaged by said lead screw and movable axially thereby when said lead screw is rotated, a contact on said member wiping on said rectilinear resistance element, circuit means connected to said rectilinear resistance element and its contact and to said rotary resistor and its contact, and an indicator in said circuit means operative to show any variance between the output of said rectilinear resistance element and the output of said rotary resistor.

4. A device for testing the output linearity of a rectilinear resistance element, said device comprising a multi-turn rotary variable resistor of known output linearity, said rotary resistor having a rotatable operating shaft, a lead screw connected to said shaft, said lead screw being supported for rotation and restrained against axial movement, a member having threaded engagement with said lead screw, means preventing said member from rotating with said lead screw, said member being moved axially by said lead screw when the latter is rotated, a contact on said member wiping on said rectilinear resistance element, circuit means connected to said rectilinear resistance element and its contact and to said rotary resistor, and an indicator in said circuit means operative to show any variance between the output of said rectilinear resistance element and the output of said rotary resistor.

5. A device for testing the output linearity of a rectilinear resistance element, said device comprising a multi-turn rotary potentiometer of known output linearity, said rotary potentiometer having a rotatable operating member, a lead screw connected to said operating member to rotate therewith, a contact member having threaded connection with said lead screw so as to be moved axially thereby when said lead screw is rotated, means for rotating said lead screw, said contact member engaging said rectilinear resistance element, a bridge circuit connected to the ends of said rectilinear resistance element and its contact and to said rotary potentiometer, said bridge circuit including a source of voltage potential connected across the ends of the resistance element of said rotary potentiometer, a variable resistor connected in series between one end of said rectilinear resistance element and one end of the resistance element of said rotary potentiometer, and means for indicating any variance between the output of said rectilinear resistance element and the output of said rotary potentiometer.

6. A device for testing the output linearity of a rectilinear resistance element, said device comprising a multi-turn rotary potentiometer of known output linearity, said rotary potentiometer having a rotatable operating member, a lead screw connected to said operating member to rotate therewith, a contact member having a threaded connection with said lead screw so as to be moved axially thereby when said lead screw is rotated, means for rotating said lead screw, said contact member engaging said rectilinear resistance element, a bridge circuit connected to the ends of said rectilinear resistance element and its contact and to said rotary potentiometer, said bridge circuit including a source of voltage potential connected across the ends of the resistance element of said rotary potentiometer, a pair of variable resistors connected in series between the ends of said rectilinear resistance element and the ends of the resistance element of said rotary potentiometer, and means for indicating any variance between the output of said rectilinear resistance element and the output of said rotary potentiometer.

7. A device for testing the output linearity of a rectilinear resistance element, said device comprising a rotary variable resistor of known output linearity, said rotary resistor having a rotatable operating member, a lead screw connected to said operating member to rotate therewith, a contact member connected with said lead screw to be moved axially thereby when said lead screw is rotated, means for rotating said lead screw, said contact member engaging said rectilinear resistance element, a bridge circuit connected to the ends of said rectilinear resistance element and to said rotary resistor, said bridge circuit including a source of voltage potential connected to the resistance element terminals of said rotary resistor, another resistor connected between one end of said rectilinear resistance element and one end of said rotary resistor, a variable resistor and a second source of voltage potential connected in series across the ends of said last-named resistor, another variable resistor and a third source of voltage potential connected in series across the ends of said rectilinear resistance element, and means connected between the contact of said rotary resistor and said contact member engaging said rectilinear resistance element, for indicating any variance between the output of said rectilinear resistance element and the output of said rotary resistor.

8. In a device for comparing the output of a test resistance element to the known output of a standard resistance element, a bridge circuit comprising a source of voltage potential connected to the ends of said standard resistance element, another resistor connected between one end of said test resistance element and one end of said standard resistance element, a variable resistor and a second source of voltage potential connected in series across the ends of said last-named resistor, another variable resistor and a third source of voltage potential connected in series across the ends of said test resistance element, a pair of contacts engaging said standard resistance element and said test resistance element, and indicator means connected between said contacts for indicating any variance between the outputs of said test resistance element and said standard resistance element.

9. In a device for comparing the output of a test resistance element to the known output of a standard variable resistor, a bridge circuit comprising a source of voltage potential connected to the ends of the element in said standard variable resistor, a pair of variable resistors connected in series between the ends of said test resistance element and the corresponding ends of said standard variable resistor, a contact wiping on the element of said standard variable resistor and a second contact wiping on said test resistance element, and indicator means connected between said contacts for indicating any variance between the outputs of said test variable resistor and said standard resistance element.

10. A device for comparing the output linearity of a test resistance element with the known output linearity of a much longer resistance element in a multi-turn rotary variable resistor, each of said elements being contacted by a movable wiper, means mechanically connecting the wiper of said test element with the wiper of said rotary variable resistor, whereby the rate of travel of the wiper on said test element is to the rate of travel of the wiper in said multi-turn rotary variable resistor as the length of said test element is to the length of the element in said rotary variable resistor, and circuit means connected to both of said resistance elements and to said wipers, including an indicator to show any variance between the output of said test element and the output of said rotary variable resistor.

11. A device for testing the output linearity of a test resistance element, said device comprising a multi-turn rotary variable resistor of known output linearity, said rotary variable resistor having a rotatable operating shaft, a member movable along the length of said test resistance element and having a contact wiping thereon, a driving connection between said rotatable operating shaft and said member, whereby the latter is moved along said test resistance element from one end to the other as said operating shaft is rotated from one end position to the other, and circuit means connected to said test resistance element and its contact and to said rotary variable resistor, including an indicator operative to show any variance between the output of said test resistance element and the output of said rotary variable resistor.

References Cited in the file of this patent

UNITED STATES PATENTS

| 2,114,330 | Borden | Apr. 19, 1938 |
| 2,482,196 | Marye | Sept. 20, 1949 |
| 2,527,138 | Kohler | Oct. 24, 1950 |
| 2,568,465 | Scott | Sept. 18, 1951 |
| 2,653,207 | Coyne et al. | Sept. 22, 1953 |
| 2,658,131 | Hamacher et al. | Nov. 3, 1953 |
| 2,665,355 | Van Alen et al. | Jan. 5, 1954 |

FOREIGN PATENTS

| 581,276 | Great Britain | Oct. 7, 1946 |